(12) United States Patent
Wong et al.

(10) Patent No.: US 7,739,597 B2
(45) Date of Patent: Jun. 15, 2010

(54) INTERACTIVE MEDIA FRAME DISPLAY

(75) Inventors: Curtis G. Wong, Bellevue, WA (US); Steve Glenner, Bellevue, WA (US); Steven M. Drucker, Bellevue, WA (US); Asta L. Glatzer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1066 days.

(21) Appl. No.: 10/611,641

(22) Filed: Jul. 1, 2003

(65) Prior Publication Data

US 2004/0168118 A1 Aug. 26, 2004

Related U.S. Application Data

(60) Provisional application No. 60/449,819, filed on Feb. 24, 2003.

(51) Int. Cl.
G06F 3/00 (2006.01)
(52) U.S. Cl. .................. 715/721; 715/718; 715/719; 715/720; 715/717
(58) Field of Classification Search .................. 715/700, 715/718–726, 727–732
See application file for complete search history.

(56) References Cited

U.S. PATENT DOCUMENTS

| | | | |
|---|---|---|---|
| 6,012,068 A | 1/2000 | Boezeman et al. | |
| 6,014,502 A * | 1/2000 | Moraes | 709/219 |
| 6,061,719 A * | 5/2000 | Bendinelli et al. | 709/218 |
| 6,064,980 A * | 5/2000 | Jacobi et al. | 705/26 |
| 6,195,655 B1 | 2/2001 | Lawler | |
| 6,317,722 B1 * | 11/2001 | Jacobi et al. | 705/14 |
| 6,356,921 B1 | 3/2002 | Kumar et al. | |
| 6,405,215 B1 | 6/2002 | Yaung | |
| 6,477,579 B1 * | 11/2002 | Kunkel et al. | 709/229 |
| 6,523,046 B2 | 2/2003 | Liu et al. | |
| 6,564,263 B1 | 5/2003 | Bergman et al. | |
| 6,675,196 B1 * | 1/2004 | Kronz | 709/203 |
| 7,117,453 B2 * | 10/2006 | Drucker et al. | 715/833 |
| 2002/0054158 A1 * | 5/2002 | Asami | 345/838 |
| 2004/0068536 A1 * | 4/2004 | Demers et al. | 709/201 |

(Continued)

OTHER PUBLICATIONS

Arnon Amir. Savitha Srinivasan, Dulce Ponceleon. and Dragutin Petkovic. CueVideo(demonstration abstract): Automated video/audio Indexing and Browsing. Proceedings of the 22nd annual International ACM SIGIR Conference. p. 326. 1999.

(Continued)

Primary Examiner—Simon Ke
(74) Attorney, Agent, or Firm—Lee & Hayes, PLLC

(57) ABSTRACT

The present invention provides a unique system and method that facilitates remote browsing, viewing, and manipulating any suitable number of media items from a host location. In particular, the invention involves pulling desired media items from one or more host locations to view and/or edit them on a remote interactive media display, thereby freeing up use of the host location/computer. The media items sent to the remote interactive media display via wireless or wired connection are easily edited, organized, and viewed in any suitable order, arrangement, and timed-cycle with respect to per item viewing as well as viewing of items coincident with a real time calendar. The media items can be annotated and otherwise modified from the remote display and saved to the host location. The remote interactive media frame also includes a local storage for storing media items, thereby facilitating portability of the media frame when disconnected from the host.

44 Claims, 12 Drawing Sheets

U.S. PATENT DOCUMENTS

2005/0015355 A1*  1/2005  Heller et al. .................... 707/1
2006/0178946 A1*  8/2006  Agarwal ....................... 705/26
2008/0052739 A1*  2/2008  Logan .......................... 725/25

OTHER PUBLICATIONS

Ka-Ping Yee, Kirsten Swearingen, Kevin Li, and Marti Hearst. Faceted Metadata for Image Search and Browsing. Proceedings of the Conference on Human Factors in Computing Systems, pp. 401-408, 2003.

Abdulmotaleb El Saddik, Amir Ghavam, Stephan Fischer, and Ralf Steinmetz. Metadata for Smart Multimedia Learning Objects. Proceedings of the Australasian Conference on Computing Education, pp. 87-94, 2000.

* cited by examiner

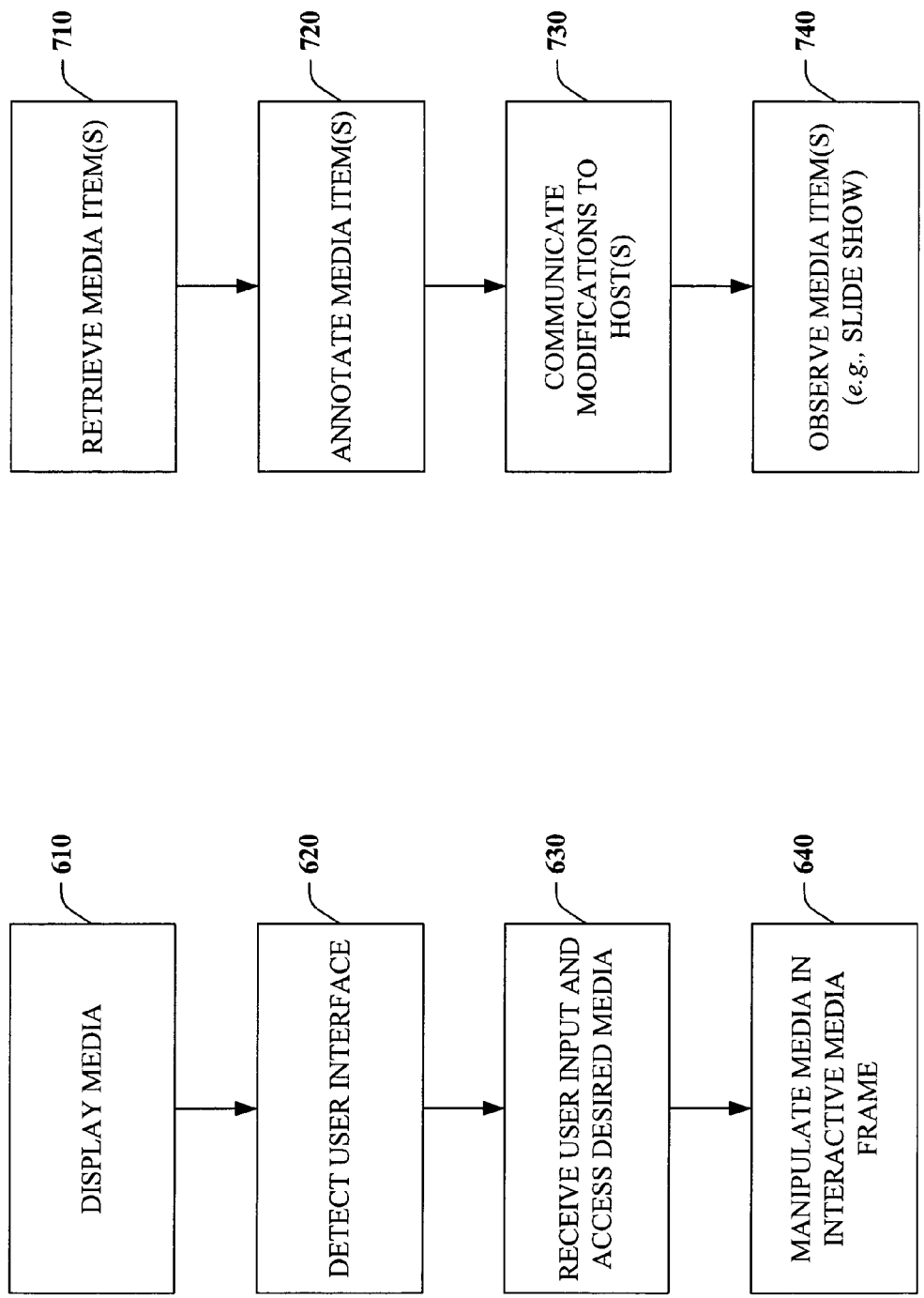

INTERACTIVE MEDIA FRAME DISPLAY

CROSS-REFERENCE TO RELATED APPLICATION

This application claims priority to U.S. Provisional Patent Application No. 60/449,819 filed on Feb. 24, 2003, entitled INTERACTIVE MEDIA FRAME DISPLAY, the entirety of which is incorporated herein by reference.

TECHNICAL FIELD

The present invention relates generally to browsing of media, and more particularly to viewing, browsing and manipulating media via a portable interactive display.

BACKGROUND OF THE INVENTION

As availability of media objects (e.g., movies, music, photographs, e-mail, video or sound cliplets, pictures, and/or messages) has increased, the task of effectively browsing, editing and retrieving media has become difficult and cumbersome. Conventional media systems for browsing, editing, viewing, modifying, sorting, and the like have provided limited ability for a user to access the media in a meaningful manner.

For example, photographs digitally scanned onto a computer processor typically have nonsensical filenames associated therewith, making it difficult to manipulate and organize them. Providing more meaningful information to each file or media object must be done individually and separately which is time-consuming and tedious for regular or frequent use involving editing, sampling, and viewing, for example. Further, conventional media systems are typically rigid and thus limit a user's ability to personalize such systems. Moreover, conventional media systems remain complex and incomprehensible for quick retrieval, use, and viewing of the media objects.

In addition, conventional media systems have limited options for displaying the media for prolonged enjoyment. For example, most consumers load their digital photos on to their computers in such a way as to view and/or display them in a slide show mode. Most digital photos are not printed but instead are primarily only viewed by a user on the computer. Thus, the user must open the respective files to view and/or edit the particular photos which can be a rather tedious series of tasks. In the case of a screensaver slide show of the user's photos, the user has to stop use of the computer to allow for the screensaver slide show to be activated to view his/her photos. However, as soon as the user resumes use of the computer, the screen saver turns off and photo viewing again is terminated. Moreover, display of digital media is restrictive, inconvenient, and even cumbersome to consumers in general.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and/or methodology that facilitate reviewing and manipulating media. The invention provides for an interactive media frame which allows for viewing and/or manipulating media. The media can be located at a remote computer, and thus the interactive media frame (e.g., typically a dedicated unit for media display and editing) frees a user from having to edit/manipulate media at a host location. Thus, for example, the interactive media frame can be located at a place (e.g., shelf) and primarily used to showcase desired media. Further, a user can employ the interactive media frame to retrieve additional media, delete media, and perform a variety of media editing and organization-related tasks, thereby greatly enhancing a media experience as compared to a conventional system that require such tasks to be performed at the location of the media store (e.g., host location).

Another aspect of the invention provides for the interactive media frame to cache and/or pull selected media from one or more disparate locations. In particular, the interactive media frame can be employed in a wired and/or wireless network architecture whereby the interactive media frame can communicate and/or interface with any suitable number of host locations (e.g., computers, servers). Thus, a user can remotely view, browse, and/or manipulate various media data via the interactive media frame that are stored on any suitable number of media data stores networked thereto. Further, the user can save any desired number of media items (e.g., pictures, photos, sound clips, video clips, videos, songs, movies, video, documents, and messages) to a memory or cache located on the interactive media frame. In practice, the user can easily view, browse, and/or edit any media items stored in the cache of the interactive frame display particularly when the frame is disconnected from a host location or network as well as remotely when connected to the host location. Thus, the interactive media frame facilitates portable viewing, manipulation, and storage of media.

For example, the interactive media display can be pocket-sized. Thus, when connected to a host location via a wireless or hard wired connection, the interactive media frame can communicate with the host such that a media data store from the host is called. Any desired number of media items are accessed and opened for viewing, editing and/or enjoyment on the interactive media display. Because the interactive media frame can include a cache and maintain pocket size dimensions, a user can enjoy and manipulate media items stored in the interactive media frame when out of range, apart, or disconnected from the host location.

The invention can also employ metadata such as during viewing, browsing, and manipulating various media items remotely on the interactive media frame. Metadata can include intrinsic metadata (e.g., creation date, content type, size, modification date . . . ) as well as extrinsic metadata (e.g., human description of the content). Intrinsic metadata can be extracted from and associated with the media item. Extrinsic metadata can be generated based at least in part by user instructions as well as by an analysis of the media items via pattern recognition, speech recognition, content analysis, face detection and the like. Further, the extrinsic metadata can be propagated in a hierarchal arrangement, thereby facilitating browsing, viewing, and editing of the media items.

One approach of utilizing metadata involves manipulating the media items based at least in part on existing metadata. Initially, the media items can be retrieved from at least one host location and viewed on the interactive media frame either individually or in groups or clusters as determined by the user. The interactive media frame can extract the metadata associated with each media item or cluster of media items and then propagate metadata lists in the form of a menu(s), thereby allowing the user to view and/or edit various media items based on their intrinsic and/or extrinsic metadata. For example, the user can browse clusters of related photographs based on the same time of year, that look similar, with people in it, with particular people in it, or that share similar metadata (at least one of intrinsic and extrinsic metadata).

A second approach of employing metadata involves calendar functionality in connection with viewing any suitable number of media items. Based at least in part upon intrinsic metadata, the user can instruct the interactive media frame to display any suitable number of media items for specific lengths of time and at specific times of the year (e.g., specific date or date range). For example, the interactive media frame can make use of a calendar operation which can be linked to a host(s) calendar(s). Thus, the interactive media frame will display all pictures taken from December $1^{st}$ through December $31^{st}$ (e.g., metadata) when the calendar indicates real time dates of December $1^{st}$ through December $31^{st}$.

In addition, the user can specify a percentage or amount of media items to display for a given period (e.g., for the month of December, display 50% of last year's Christmas photos, 40% of media items accessed by the frame in the last 10 days and 10% of randomly selected media items from the media store(s)). Therefore, each of the media items would appear as a slide show on the interactive media frame for a prescribed amount of time (e.g., 10 seconds, 30 seconds, 20 minutes, etc.). Further, the user can specify a quantity of media items displayed at a given time (e.g., display 2, 3, etc. at once or per frame). Even further, the user can determine an amount of time selected media items are displayed for viewing. For example, the user can specify the following to be displayed: items created at the same time last year 50% of the time, Italy trip 30% of the time, items user specifically sent to the interactive media frame 10% of the time, and random items pulled from the host/network media store 10% of the time).

It should be appreciated that media items can be marked "private" and thus, remote user access can be restricted by requiring a password or some other security measure to prevent unauthorized user access. Therefore, when pulling items from the host media store, items marked private may or may not be made available for pulling to the interactive media frame.

A third approach that makes use of metadata involves simple and rapid annotation of keywords and phrases to the media items such as by user audio input. Users can easily and quickly cluster and group media items based on intrinsic and/or extrinsic metadata in order to rapidly manipulate groups of related media items. In addition, browsing and viewing controls such as sliders and scroll bars located at a periphery of the interactive media frame display can be used to focus on a working set of media items which can be readily manipulated as a group or as individually. For example, when the desired media item(s) are viewed, the user can annotate them by speaking "sister, spring break, $4^{th}$ of July party, family reunion", respectively, for example, for the appropriate media items. The new metadata is communicated to the host location and saved in the media data store with the appropriate media item. Thus, annotation of the media items takes place remotely from the host media data store.

Another aspect of the subject invention employs artificial intelligence systems to facilitate viewing of various media items based at least in part upon historical data relating to media items sent to the frame, viewing preferences, and the like. This facilitates automatic and timely viewing and/or editing of media items, including new media items added at one or more host locations. The interactive media frame can be trained to automatically search for related new media items in the host(s) media store and process them according to previously set annotation and viewing parameters.

Further, the media items accessed by the interactive media frame include a host location identifier in the respective metadata such that when multiple media items are accessed from more than one host location, any changes to the media items are communicated back to the appropriate host location and saved in the respective media store. Hence, the present invention provides a unique system and method for simple viewing and manipulation of media items at a remote location which can be communicated and saved immediately to a host location.

Moreover, the interactive media frame display provides for a highly portable and practicable device/architecture that enhances a media experience.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 6 is a flow chart illustrating an exemplary methodology for remotely accessing and manipulating media items in accordance with an aspect of the present invention.

FIG. 7 is a flow chart illustrating an exemplary methodology for remotely accessing and manipulating media items in accordance with an aspect of the present invention.

DETAILED DESCRIPTION OF THE INVENTION

Figure 1:
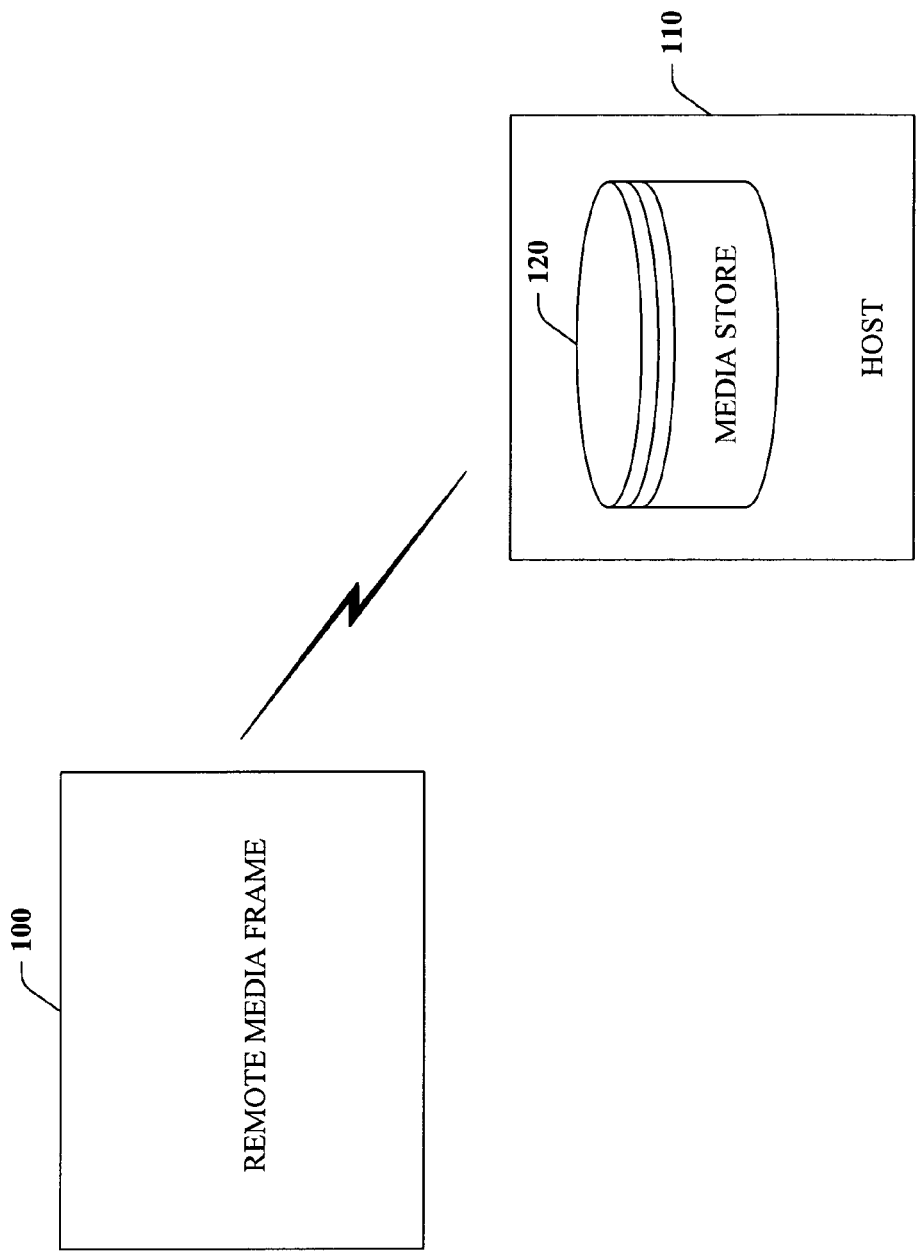
FIG. 1 is a block diagram of an interactive media frame display interfacing with a host in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

In addition, the term "media item" as employed in this application is intended to refer to pictures, photographs, music, sounds, text, e-mail, movies, video, messages, documents, slides, movie or video stills, streaming video and/or audio, and/or any combination thereof and/or any cliplet thereof, and in any suitable format or file type for carrying out the subject invention.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Accordingly, the subject invention (e.g., in connection with the employment of bins) can employ various artificial intelligence based schemes for carrying out various aspects of the subject invention. For example, classification of media items and annotation thereof can be facilitated via an automatic classification system and process. Such classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees and, probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information . . . ) so that the classifier(s) automatically annotate, file, group, cluster, and merge media items in accordance with user preferences. For example, with respect to Support Vector Machines (SVM) which are well understood—it is to be appreciated that other classifier models may also be utilized such as Naive Bayes, Bayes Net, decision tree and other learning models—SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)$=confidence(class). In the case of text-based media classification, for example, attributes are words or phrases or other domain-specific attributes derived from the words (e.g., parts of speech, presence of key terms), and the classes are categories or areas of interest (e.g., levels of priorities).

Referring now to FIG. 1, there is a general block diagram of an interactive media frame (IMF) display 100 in accordance with an aspect of the present invention. The IMF display 100 operates remotely with respect to a host location 110. More specifically, the IMF 100 can access a media store 120 located on the host 100 via a wired or wireless connection and pull one or more media items for viewing, editing, and/or organization-related operations from the host media store 120. Changes made to any one of the media items can be communicated to the host and saved to the appropriate location such as the media store 120 and/or some other memory component (not shown).

In addition, the media items sent to the IMF 100 as well as any changes made to these media items can also be saved and/or cached to a local storage component on the IMF 100. This allows a user to continue to view and/or manipulate one or more of the media items when disconnected from the host 110. Accordingly, the IMF display 100 can be portable and easily transportable while maintaining full functionality, use, and enjoyment of the media items loaded thereon.

As mentioned the IMF 100 can remotely access a media store(s) 120 from the host 110 such that any suitable number of media items can be retrieved and sent to the IMF 100. The media items can be viewed for enjoyment individually or in clusters such as in a slide show format on the IMF display 100. Alternatively, the media items can be manipulated in a variety of ways. For example, one or more media items can be deleted from the IMF 100. Such a deletion can then be communicated to the media store 120 such that the deletion takes effect there as well. Otherwise, the deletion can be local to the IMF 100 thereby not affecting the host media store.

Another example includes annotating one or more media items with metadata. Remote annotation of metadata to the media items on the IMF 100 is a simple and fast process. The media items and their associated metadata properties are sent to the IMF display 100. The IMF 100 can extract and employ the metadata to populate metadata lists (e.g., intrinsic and/or extrinsic metadata). Using these lists of metadata, the user can annotate any one of the media items by annotating it with metadata from one of the populated lists.

For instance, three pictures having metadata "spring break" are sent to the IMF 100. Two other pictures also sent to the IMF 100 were taken during spring break but have not been annotated with the "spring break" metadata. Therefore, the user can select to annotate the two pictures with the "spring break" metadata as well as any other metadata from the populated lists as desired.

Annotation can also occur by verbal input and/or voice recognition systems by the user speaking various keywords, phrases, and the like into a microphone component (e.g., FIGS. 3 and 4, infra) located on the IMF display 100. Thus, the user speaks "spring break" to annotate a video clip taken during spring break. Additional metadata can also be annotated to the video clip. As soon as the annotation(s) occurs, the modification(s) can be transmitted back to the host 100 to update the media store 120. Annotation using face and pen-ink recognition systems can also be implemented in combination with artificial intelligence systems (discussed infra, FIG. 5) to quickly, easily, and remotely annotate the media items.

New metadata can also be generated (by a metadata generation component—not shown) and utilized in subsequent annotation processes. The metadata generation component analyzes the media items to extract characteristics and/or properties common to the media items. The analyses can employ face recognition, pattern recognition, voice recognition, content analysis, and the like.

According to one aspect of the subject invention, the IMF 100 can be directed to randomly access the host 10 to determine whether new media items have been added to the media store 120 but have not been retrieved by and/or sent to the IMF 100. Alternatively, the IMF 100 can be programmed to access the host 110 on a regularly scheduled basis (e.g., every Monday, every Monday at 10:00 AM, etc.). For example, intrinsic metadata associated with the media items stored in the media store 120 may be searched or scanned to detect media items having creation dates within the past 2 days, for example, that have never been accessed by the IMF 100. Such media items can be sent to the IMF 100 for viewing and/or manipulation. In general, the IMF 100 can search and/or browse the host media store 120 for all related media.

According to another aspect, the IMF 100 can be instructed to access the host 110 on a random or scheduled basis to look for new media items having particular metadata associated therewith. For instance, the IMF 100 can search for new media items having the "sister" metadata attached thereto. If detected, one or more of such media items can then be sent to the IMF 100 and/or appear on the display. The previously loaded media items are not affected. Instead, the new media items can simply be incorporated into the viewing cycle. Thus, the user can view and/or manipulate recent pictures containing "sister" on the IMF 100 virtually automatically; that is, mitigating repetitive action by the user and manual access of the host 10 either directly or indirectly (e.g., via the IMF 100) for new and new related media items.

It is to be appreciated that the user-based input (e.g., to facilitate directing annotation of the media items) is intended to include instructions provided via classifier(s) (e.g., explicitly and/or implicitly trained). Accordingly, as media item(s) are received by the IMF 100, the IMF can automatically group, merge, and annotate the media item(s) based at least in part upon employment of a classifier(s). Thus, the IMF 100 with a properly tuned classifier can greatly facilitate working with the media item(s) in accordance with the subject invention.

In practice, metadata associated with each media item or a cluster of media items facilitates viewing the media items in a particular arrangement, order, and/or scheme. For example, media items having "family reunion" metadata attached thereto can be sent to the IMF 100 for viewing. Thus, all media items having this metadata can be sent to the IMF 100 for viewing. One approach involves allowing the user to designate a percentage of media items to retrieve for viewing. For instance, the user can designate 70% of the "family reunion" media items to be sent with 30% of the "Aunt Mary" (e.g., extrinsic metadata) media items to the IMF 100 for viewing and/or editing. Another approach involves randomly retrieving multiple media items from the media store 120 whereby the user can designate which media items to view and/or an order of viewing them based at least in part upon the respective metadata on the IMF display 100.

Retrieving and/or viewing one or more media items can also be facilitated by invoking a calendar function. In particular, the IMF 100 can interface with a host real time calendar. Alternatively, the IMF 100 can include its own real time calendar that mirrors and is coincident with the host calendar. Thus, by indicating which media items to retrieve from the media store 120 and/or view on the IMF display 100 during user-defined periods of time and/or dates, the IMF 100 can automatically retrieve and/or display such items. For example, media items in the media store 120 having "wife's birthday" and "June 11" metadata associated therewith can be automatically retrieved by the IMF 100 from the media store 120 on the real time calendar date of June $11^{th}$. Therefore, the user can view all such related media items on at least the $11^{th}$ of June of each year.

In order to conserve space on the IMF 100, the user can also program it to delete, close, and/or remove expired media items from the IMF 100 only. Such as those designated for viewing by calendar dates, thereby preserving them in the media store 120 on the host 110. Referring to the previous example, the IMF 100 can delete or close the media items having "wife's birthday" and "June 11" associated therewith on June $12^{th}$ from the IMF 100.

Figure 2:
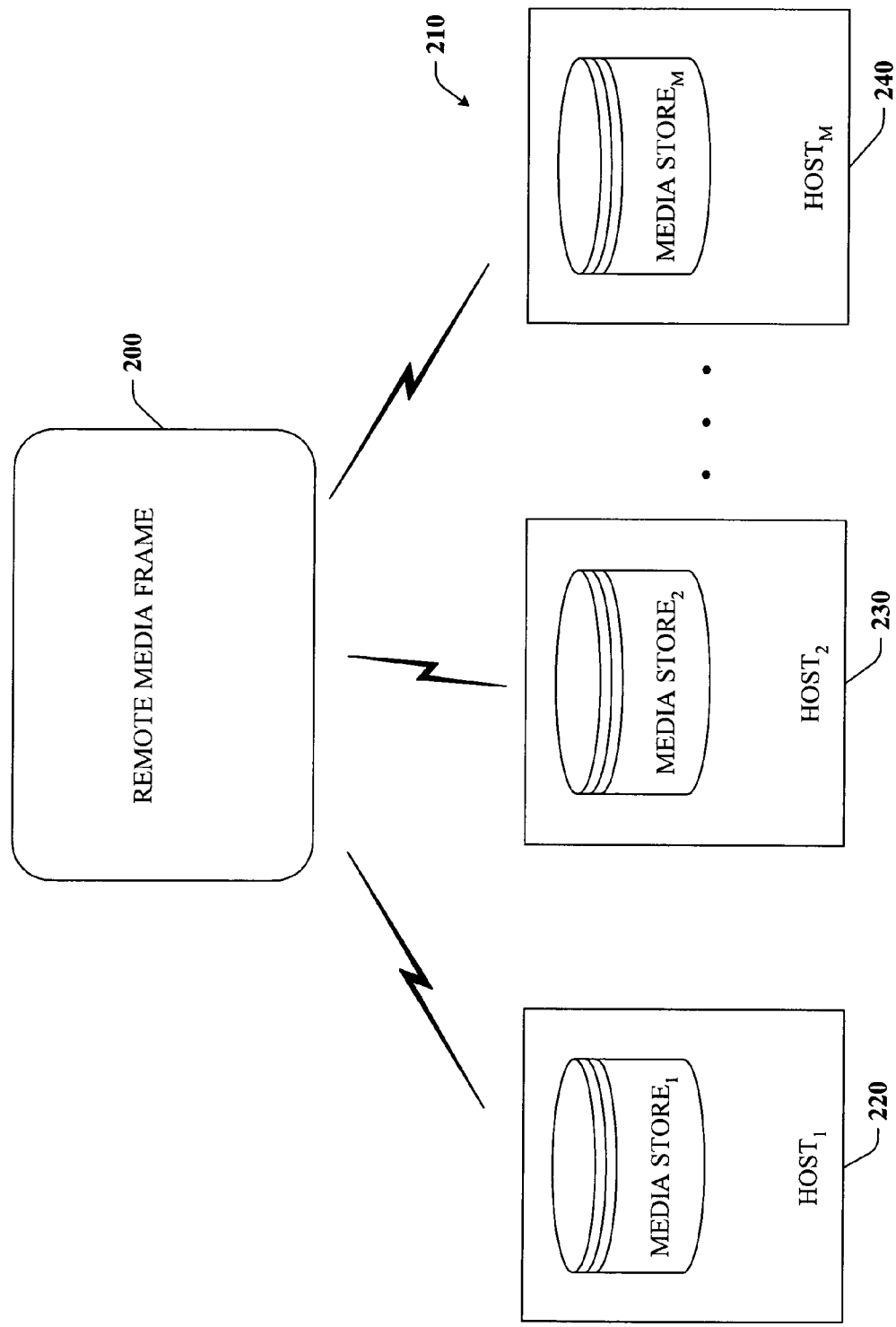
FIG. 2 is a block diagram of an interactive media frame display interfacing with a plurality of hosts in accordance with another aspect of the present invention.

Referring now to FIG. 2, there is a general block diagram of an IMF display 200 in communication with multiple host locations in accordance with an aspect of the present invention. The IMF display 200 performs similarly in connection with multiple hosts 210 (individually denoted as HOST$_1$ 220. HOST$_2$ 230, and HOST$_N$ 240, where N is an integer greater or equal to one) as described hereinabove in FIG. 1.

Each host 210 includes a respective media store such as media store$_1$ 250. MEDIA STORE$_2$ 260, and MEDIA STORE$_N$ 270 (collectively media store 280). The IMF display 200 can remotely access and retrieve any suitable number of media items from each host 210. Access and retrieval may occur concurrently with respect to each host 210 and/or may occur successively with each host 210, whereby the order of host access depends on any one of a communication link, connection speed, data transfer rate, and readiness of the host (e.g., whether its busy performing other operations at the time of the IMF 200 attempts to access the particular media store 280).

Because each host 210 and its respective media store 280 may contain different media items, the respective media items can be annotated with metadata denoting the host name, location, etc. . . . such that when a media item is modified by the IMF 200, the changes can be communicated to the appropriate media store 280 quickly and easily. Thus if connection to the HOST$_1$ 220 is temporarily lost for some reason, a change to one of its media items cannot be transmitted and saved in the media store$_1$ 250 until the connection between the IMF 200 and the HOST$_1$ 220 is restored. This can be due to security reasons when particular media items cannot be shared among hosts 210. Alternatively, the user may permit the sharing of media items between hosts 210 by altering user preferences with respect to each host.

The hosts 210 may be arranged in a network-type architecture with respect to the IMF 200 whereby the hosts 210 are linked to each other as well as to the IMF 200 either by a wireless or wired connection. The wireless connection permits the IMF 200 to be placed virtually anywhere in proximity of the host or hosts 210, thereby allowing the IMF 200 to be positioned on a shelf, desk, table, or wall to facilitate enjoyment and use of the displayed media items by the user. Alternative network configurations can be also employed to carry out the subject invention and such are intended to fall within the scope of the invention.

Figure 3:
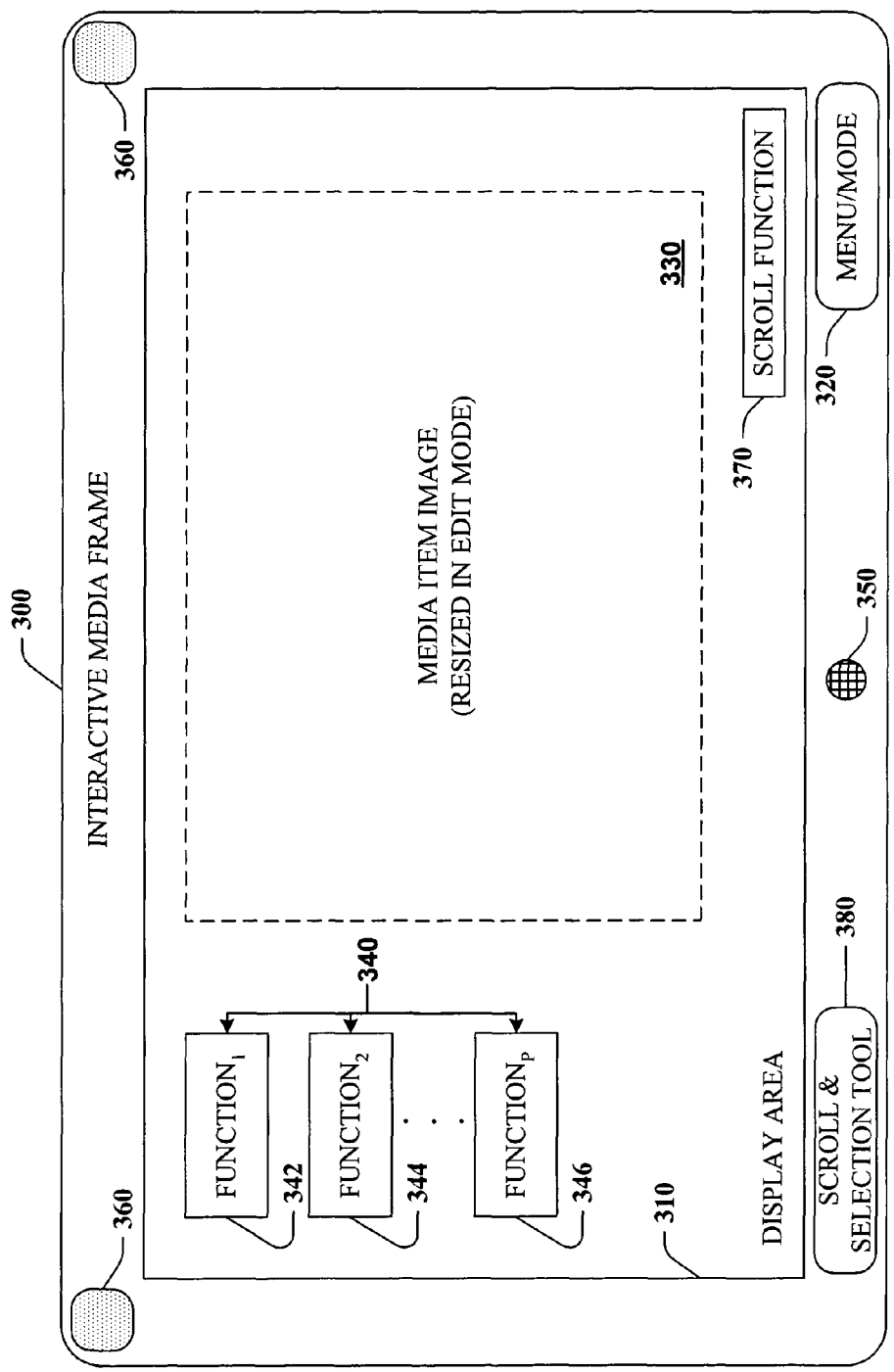
FIG. 3 is a block diagram of an exemplary interactive media frame display in accordance with yet another aspect of the present invention.
Figure 4:
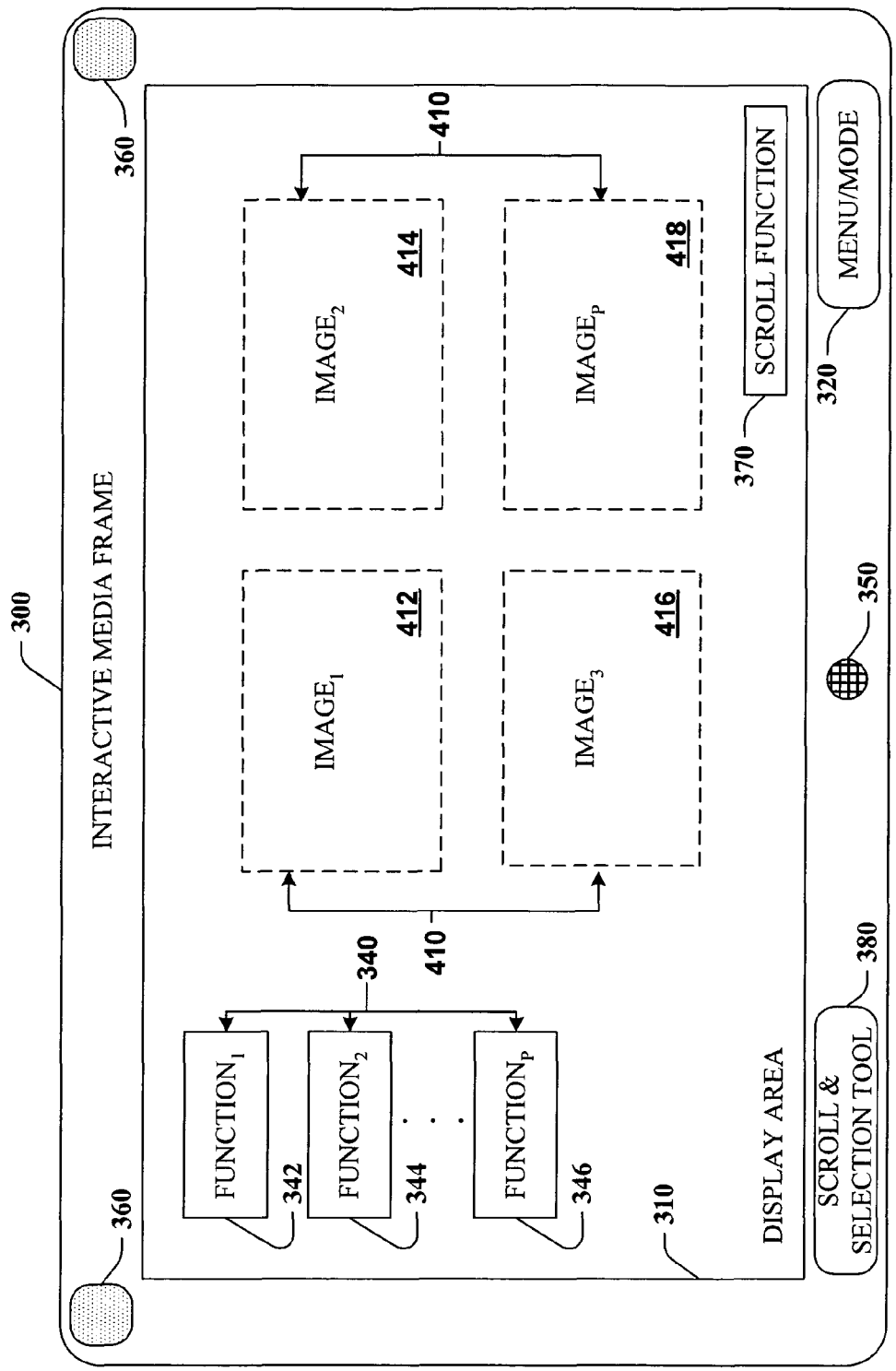
FIG. 4 is a block diagram of an exemplary interactive media frame display in accordance with still another aspect of the present invention.

Referring now to FIGS. 3 and 4, there are illustrated exemplary user interfaces for an interactive media frame display in accordance with an aspect of the present invention. In FIG. 3, an exemplary interactive media frame (IMF) display 300 in plan view. The IMF display 300 comprises a display area 30 for viewing, editing, and/or manipulating one or more media items 330. Optionally, the display 310 can be implemented as a touch screen for receiving user input.

A menu/mode component 320 can be employed by a user to manually switch between a display for viewing the media item(s) 330 and a display for editing the media item(s) 330. For example, there can exist a view mode (e.g., for enjoyment) and an edit mode (e.g., for organizing, manipulating, and modifying the media items).

The view mode allows the user to enjoy and observe the media items, for example, in a slide show presentation. While in view mode, the user may choose to skip forward or back to particular items or to pause the slide show on a media item to edit that media item. In the edit mode, one or more menus can pop up on the display to provide the user with editing options for organizing, manipulating, and/or modifying the displayed media item 330. For example, selecting one menu can cause one or more sub-menus or functions 340 (denoted as FUNCTION$_1$ 342, FUNCTION$_2$ 344, and FUNCTION$_P$ 346, where P is an integer greater or equal to one) to open, thus providing additional viewing/editing options.

Examples of viewing options include, but are not limited to, retrieving an additional media item(s) 330, setting up and/or modifying viewing cycles, image transition patterns (e.g., fade in/out patterns, motifs, speed), the number of media items 330 to view at once, dates to view one or more of the media items 330, expiration dates of media items (e.g., they can be automatically removed from the IMF display 300 and/or any related storage device thereon (not shown) according to a specified date (e.g., metadata)), manual removal of media items from the IMF display 300, and percentage of media items to view (e.g., media items are designated by their respective metadata).

Examples of editing options include, but are not limited to, annotating and organizing the media items as desired. An optional audio input/receiver component 350 such as a microphone facilitates voice annotations and/or voice commands (e.g., short, "Christmas" displays media items tagged with "Christmas" metadata). Likewise, an optional audio output component(s) 360 such as a speaker(s) can provide audio output of media items involving sound such as video clips and/or a song(s) in combination with a picture or picture slide show.

The viewable size of the media items 330 can differ depending on the implemented mode. For example, in edit mode, the media item 330 is sized down such that it is entirely viewable during editing, as depicted in FIG. 3. However, the size of the media item is maximized when in view mode to enhance the user's enjoyment of the media item 330. Thus, the size of the media item whether in edit mode or in view mode is optimized for the amount of display space available.

A scroll function component 370 and/or a scroll and selection tool 380 can also be included in or on the IMF display 300. The scroll function component 370 can be utilized particularly when the display 310 acts as touch screen. Thus, the user can simply touch the scroll function component 370 at an appropriate location to peruse through the one or pop-up menus (not shown), the one or more functions 340, and/or the media items 330. The scroll and selection tool 380 is employed particularly when the display 310 is not implemented as a touch screen. However, it can also be used in conjunction with the scroll function component 370. The scroll and selection tool 380 allows the user to move through any suitable number of menus, sub-menus, functions 340, and media items 330 and facilitates a selection(s) thereof.

FIG. 4 illustrates an IMF display 400 that includes similar components and features as previously described supra with respect to FIG. 3. However, in the IMF display 400, a plurality of media item images 410 (denoted as IMAGE$_1$ 412. IMAGE$_2$ 414. IMAGE$_3$ 416, and IMAGE$_P$ 418) are depicted in the display area 310. Viewing the plurality of images 410 facilitates faster and easier annotation and editing of the media items, particularly when the user desires to tag a cluster of media items 410 with the same or similar metadata or to perform any other editing operation to the cluster of media items 410 rather than individually. Thus, repetitive actions are mitigated. Although four media items 410 are demonstrated in the display area 310, it should be appreciated that any number of media items can be concurrently displayed as desired by the user. The viewable size of each media item 410 is optimized, thus, as more or less media items are concurrently displayed, their individual size decreases or increases, respectively. A plurality of media items can be viewed when in view mode and/or edit mode.

Figure 5:
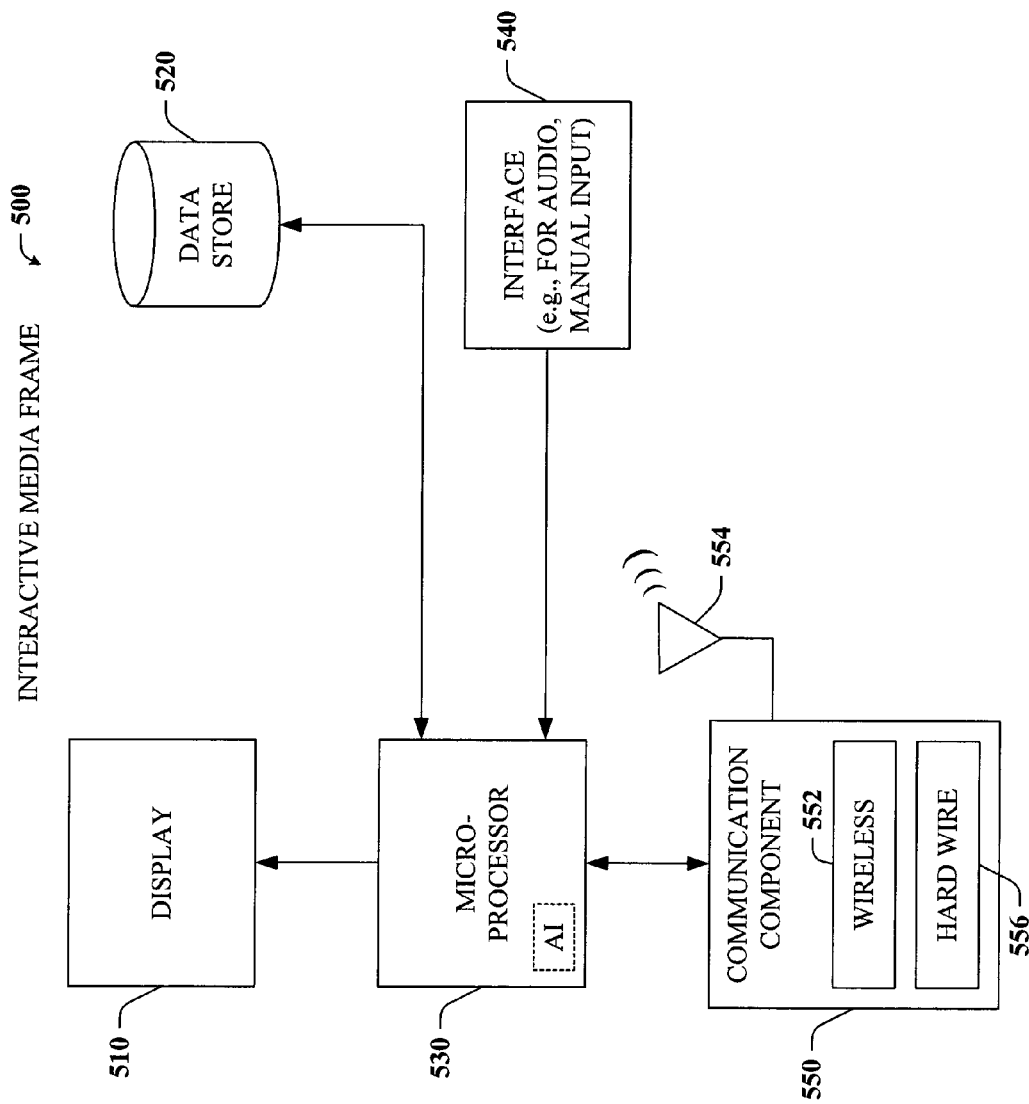
FIG. 5 is a block diagram of an interactive media frame display in accordance with an aspect of the present invention.

Referring now to FIG. 5, there is illustrated a schematic block diagram of an interactive media frame (IMF) 500. The IMF can serve as a remote viewer/tool for displaying and/or manipulating one or more media items retrieved from a host location(s) (not shown). Any manipulations performed on the media items can be saved to the host location, and specifically, in a host media store (not shown). The IMF 500 can vary in size and thickness depending on whether one or more optional components are connected thereto as well as on user preference. Thus, the IMF 500 can be pocket-sized, for example, for greater transportability, or any larger size, such as for easier viewing of details.

The IMF 500 comprises a display 510, whereon one or more media items can be viewed, watched, and/or observed for personal enjoyment as well as can be manipulated, organized and/or edited to facilitate personal enjoyment of the media items. In practice, a data store 520 has stored one or more media items which have been retrieved from the host media store. When a media item or a cluster of media items are retrieved from the host, copies of the selected media items can be sent to the IMF 500 to preserve "original" versions of the respective media items. Alternatively, the retrieval mechanism can be similar to opening a file for use—meaning that when a media item is sent to the IMF 500, the IMF 500 and its components have control over the media item as if it were being opened from or by the host location.

The data store 520 (e.g., local data store) can be limited in size with respect to the number of items stored therein due to overall structural and physical constraints of the IMF 500. However, the data store 520 facilitates portability of the IMF 500 since at least some media items can be saved and viewed when disconnected from the host or without network connectivity.

A microprocessor 530 in the IMF 500 opens one or more media items from the data store 520 for viewing and/or editing based at least in part upon user input via an interface component 540. The interface component 540 comprises manual input capability as well as voice/audio input capability via a microphone component (not shown) located on the IMF 500. Examples of manual input include touch screen functionality with respect to the display 510 for receiving user input as well as command buttons and/or keys located on the IMF 500, upon which the user can press to make his/her appropriate selection(s). One or more command buttons can correspond to at least one of play, back, reverse, forward, stop, pause, menu, mode, edit mode, view mode, annotation function, order function (e.g., alphabetical, chronological, and/or color scheme), skip, populated metadata lists, file size, media item size, speed, time, date, volume, save delete, scroll bar, scroll tool, and power.

The microprocessor 530 applies the user input to the one or more media items in the display 510 and/or in the data store 520 depending on the type of input/instructions received from the user. For instance, media items having "July 4" metadata tagged thereto are opened in the display 510. User input via a voice command indicates that these media items are to be further annotated with metadata "Italy". Thus, using an annotation component incorporated into the microprocessor 530 and/or as part of the IMF 500, the respective media items are annotated with the metadata.

Alternatively or in addition, the microprocessor 530 can operate according to learned behavior or in an automated fashion using artificial intelligence. For example, when media items are introduced into the display and/or data store 520, the microprocessor 530 (by way of the annotation component) can automatically extract metadata such as intrinsic metadata from the media items and organize the media items based at least in part upon the intrinsic metadata. The microprocessor 530 can also perform an analysis of the media items based at least in part upon any one of content, pattern recognition, face detection, and like. Subsequently, the microprocessor can generate and/or obtain metadata relating to such characteristics without requiring constant instructions from the user. Thus, the microprocessor exhibits learned behavior (e.g., based at least in part on previous input provided by the user, or training—explicit as well as implicit).

Accordingly, for example, the IMF 500 (by way of the data store 520) can receive a set of pictures and annotate the respective pictures with metadata that identifies individual(s) within the pictures and relationship(s) among the individual(s)—the identification of the individual(s) can be based at least in part upon face recognition systems employed by microprocessor 530. It should be readily apparent that any of a variety of analytical techniques for analyzing content of media items can be employed with the annotation aspects of the subject invention to provide an extremely powerful tool for handling large amounts of media items as well as for providing for a more rich and robust system (as compared to conventional system) for handling media items at an extremely granular level that is highly scalable and optimizes use of valuable computational resources let alone user time. Moreover, the microprocessor controls, operates, and tracks the retrieval from, any modifications made to the of the one or more media items from the respective host locations.

Furthermore, the IMF 500 can facilitate browsing and editing of media items in a host media store or in a local data store related to a most recently completed annotation task and/or related to media items currently displayed in the display 510 (e.g., either visible or in the background). Thus, user input corresponding to "find like objects" or something of that effect can cause the IMF 500 (by way of the microprocessor 530) to search through all other media items in a database (e.g., linked or connected to the IMF 500 such as host media store(s)), for example, which are related to the displayed media item based at least in part on the metadata attached thereto. Alternatively or in addition, the user can indicate either manually or by voice instruction which metadata to browse or search for. The searching and/or browsing of the database can be enhanced by employing a recognition component (not shown). The recognition component can employ face detection, voice and/or pattern detection, content analysis, context analysis, pen/ink recognition, etc. to extract intrinsic metadata information as well as content information about the available media items. Similar or related items can be indicated to the user once determined in the display 510, for example. It is to be appreciated that such searching and/or browsing is not limited to media items saved at one local or host location, but that the searching and/or browsing can be conducted across an intra-net, distributed network or even the Internet.

For example, the microprocessor 530 can identify attributes associated with the media item (e.g., the identification can be based upon historical data, currently extracted data, and combination thereof . . . ), and perform a search for items across the Internet. The IMF 500 can provide links to the found items as part of the search results, or even retrieve the items (and place them in a search results data store, either at the host or locally, for example). As a user sifts through the display 510 and/or the data store (local 520 or host), and deletes unwanted items found via the search, a classifier could be employed and implicitly trained using such deletion information to refine the microprocessor 530 and ultimately the IMF 500 so as to improve future searching and/or browsing.

Optionally, the microprocessor 530 can comprise and/or interface with a scrubber (not shown) which facilitates distilling the most pertinent metadata associated with the media item apart from the other metadata. The scrubber comprises a metadata removing component that removes extraneous metadata which have been tagged to the media item through various annotations and manipulations. The metadata removing component determines which metadata to remove based at least in part on user-based input. The scrubber for example could be employed to remove properties associated with a set of documents and/or images as well as a resetting of the properties.

The scrubber can include a variety of filters that can facilitate selective removing of undesired metadata from an item while keeping intact desired metadata. The scrubber can be tailored as desired by the user to view metadata associated with the media item and remove or add metadata thereto as desired. It is to be appreciated that the scrubber can also be used to modify/update existing metadata with updated attributes (e.g., Jane Doe changing from her maiden name to Jane Smith). It is also to be appreciated that the scrubber can perform compression on an existing metadata set so as not to necessarily remove the metadata but make more efficient use of storage capabilities.

The microprocessor 530 communicates with the host(s) or host network(s) by way of a communication component 550 operatively coupled thereto. The communication component 550 can comprise wireless connectivity 552 and hard wire connectivity 554. Wireless connectivity provides a greatest amount of freedom for the user to move the IMF 500 within a proximal range of the host(s) such that an antenna component 564 can transmit and receive information in the form of signals from the host(s). Conversely, hard wire connectivity 554 comprises cables, switches, plugs, lines, cords and the like such that the IMF 500 and the host(s) maintain a physical connection for communication and information transfer.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 6, there is a flow diagram of a process that makes use of an IMF unit in connection with viewing, editing, and manipulating media items according to an aspect of the present invention. The process can be implemented with respect to a host and/or the (remote) IMF display. For example, one or more media items can be displayed on the IMF display at 610. At 620, a user interface is detected, examples of which include a microphone component, one or more buttons or keys on the IMF and/or a touch screen display. Once the user interface is detected, user input is received and the desired media items can be accessed at 630 for editing. Following thereafter, the accessed media items can be manipulated at 640 in and by the IMF display.

With reference to the host, access to the desired media items can be accomplished in part by the remote IMF unit retrieving the media items from the host media store and causing the media items to be transferred (e.g., copies or originals) to the IMF display, where they can be manipulated (at 640). Examples of manipulations include, but are not limited to, annotation (e.g., tag with metadata), scrubbing of metadata, modifying viewing cycles with respect to an amount of time each item is viewed on the display until the next item appears, clustering of items to be viewed (e.g., designation of percentage of items such that items are identified at least in part by the respective metadata), real time calendar set-up (e.g., designate items according to their metadata for viewing for particular time periods or on a particular date(s) coincident with a real time calendar), deletion or removal of a media items(s) from the IMF unit, and storing a media (item) on a local storage device (e.g., on IMF).

Referring now to FIG. 7, there is illustrated a flow diagram of a process demonstrating host-remote interaction between a host computer and a remote IMF display unit. After preliminary configurations to secure a connection between the IMF display and the host computer, the remote IMF retrieves one or more media items from a host media store or database at 710. The media items retrieved can be a random sampling of the stored media items or can be a sample based at least in part upon one or more metadata and/or a plurality of metadata. That is, one or more of the media items may have metadata in common.

At 720, the media items can then be further edited such as by annotating one or more of them with additional metadata. The additional metadata may be generated by a user or may be derived from metadata associated with at least one other media item located in at least one of a remote data storage, a host(s) database, and the IMF display—meaning that at least a portion of the media items displayed in the IMF about to undergo further annotation can already contain metadata. This metadata may or may not be attached to the other media items displayed. Hence, this metadata can be extracted from those media items and employed to annotate other media items.

Any such modifications to the media items can be communicated to the host(s) at 730 and specifically to the host database where such media items are stored. Concurrently or thereafter at 740, the media items are displayed for pleasurable viewing by the user. For example, the media items can be arranged in a slide-show format, whereby each media item is viewable for a period of time (e.g., 30 seconds), thus allowing the media items to cycle over and over again until it is directed to stop, to switch the viewing order, to modify the viewing time cycle, and/or to remove the media item(s).

Figure 8:
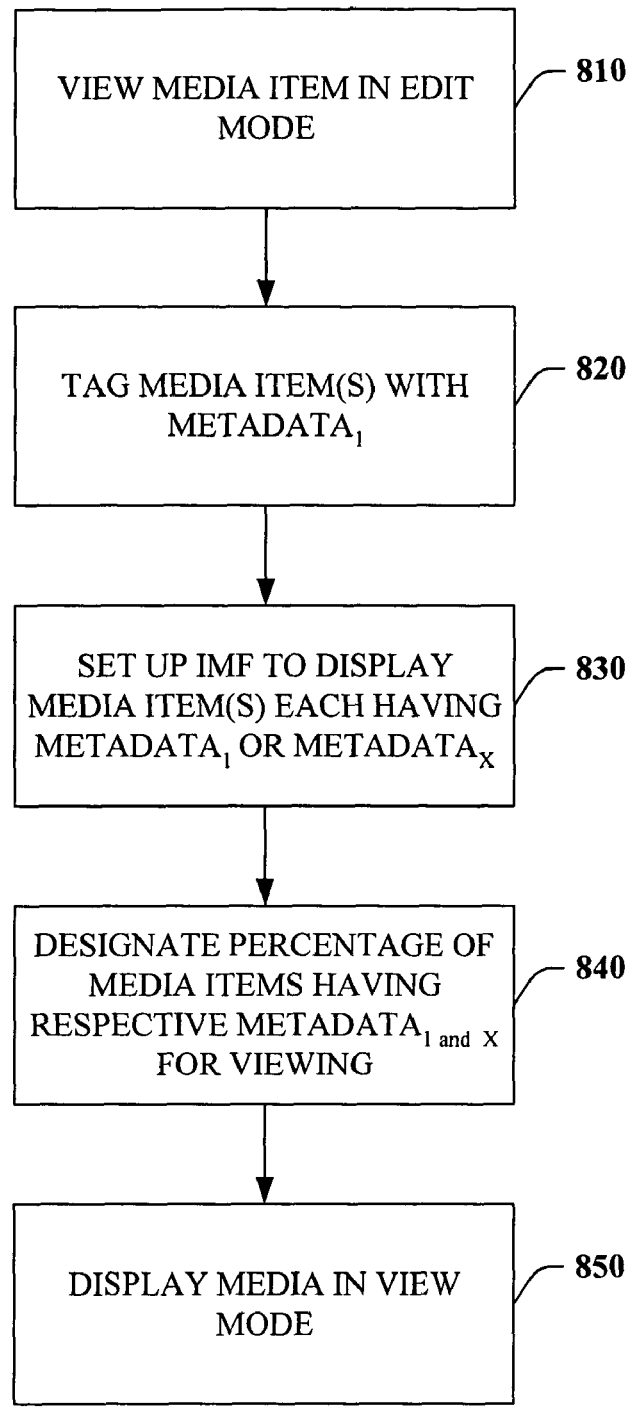
FIG. 8 is a flow chart illustrating an exemplary methodology for remotely accessing and manipulating media items in accordance with an aspect of the present invention.

Referring now to FIG. 8, there is a flow diagram of a process for selectively viewing media item(s) on an IMF display based at least in part upon the metadata tagged thereto. For example, the media item(s) are viewed on the IMF display in an edit mode at 810 (as opposed to a viewing mode which can or cannot permit editing to the media items). At 820, the media items are tagged with $METADATA_1$ which can correspond to last year's Christmas. Thereafter, other media items can be retrieved if they have and/or are tagged with $METADATA_X$, where X is an integer greater or equal to one. Thus, the media items currently on the IMF comprise media items annotated with $METADATA_1$, media items annotated with $METADATA_X$. In addition, other media items annotated with other metadata can also be on the IMF (e.g., meaning on the display—in the viewable area or in the background—and/or stored in a local data store). It should be understood that some or all of these media items can be stored on a data store located on the IMF at any suitable time during the process of FIG. 8.

At some earlier time or thereafter act 820, the IMF can be configured at 830 to display all media items, wherein the media items are either tagged with $METADATA_1$ or $METADATA_X$ such that media items from the host database having such metadata properties can also be accessed and sent to the IMF. To further vary the types of media items displayed (in view mode), the user can designate an amount (quantity) or a percentage of media items tagged with particular metadata.

For example, at 840 the user designates that 50% of media items annotated with $METADATA_1$ are to be viewed in combination with 40% of media items annotated with $METADATA_X$, and 10% of randomly selected media items having any metadata associated therewith (e.g., including or excluding those with $METADATA_1$ and/or $METADATA_X$ can also be specified). At 850, the user-specified combination of media items can be viewed individually in a slide show style, in randomly chosen clusters of at least two media items, or in pre-selected clusters of related or non-related media items. Moreover, the IMF facilitates fast and easy modification to and viewing of the user's favorite media items wherein such viewing can be personalized and can be transportable apart from the host and a connection thereto.

Figure 9:
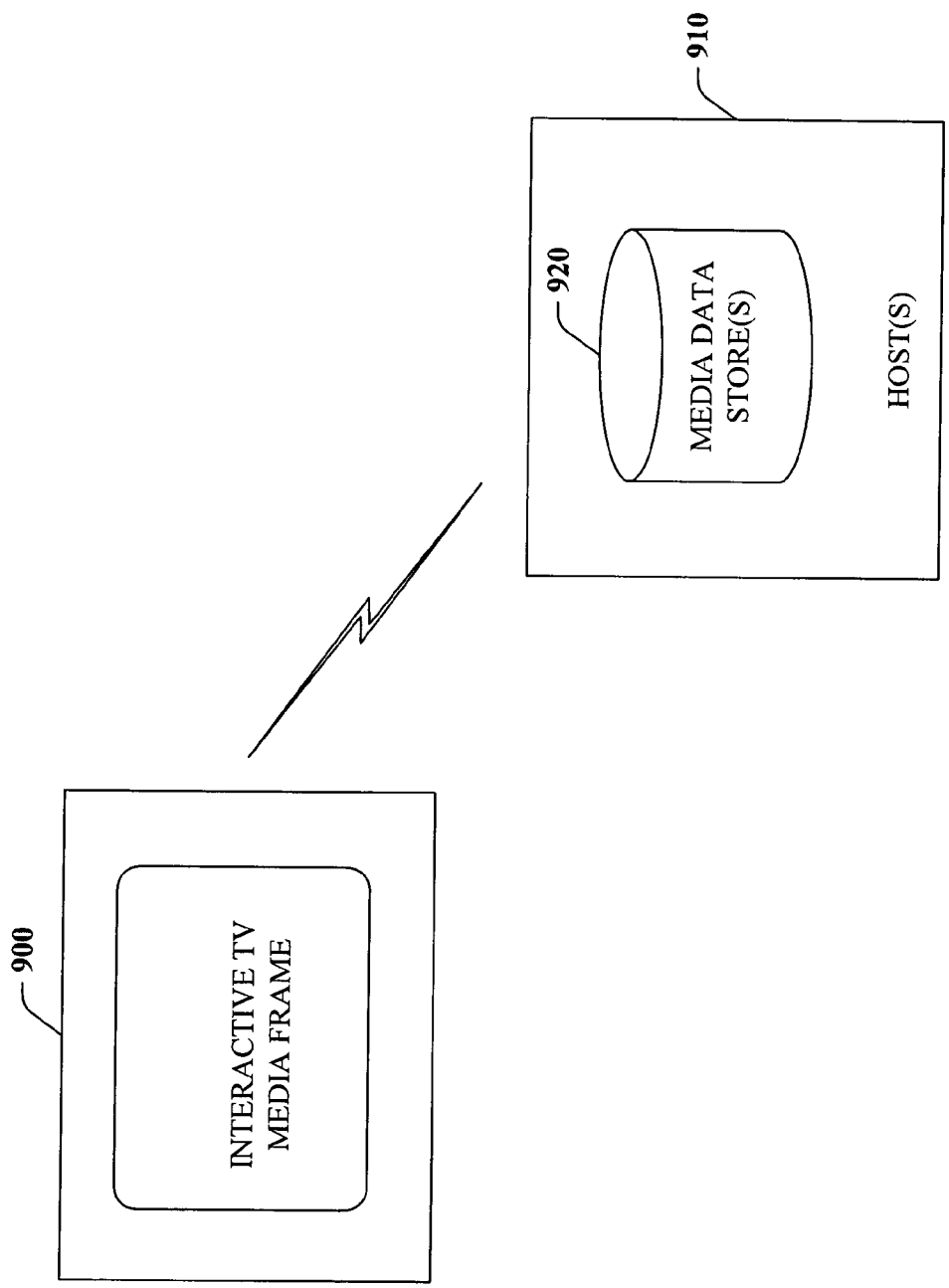
FIG. 9 illustrates a block diagram of an interactive television media frame in accordance with one specific implementation of the subject invention.

Referring now to FIG. 9, there is illustrated an alternative embodiment of the present invention. An interactive television (TV) media frame display 900 is depicted interfacing with a host location 910 (e.g., computer, server). The host location 910 can include one or more computers and/or servers and is operatively connected to the interactive TV media frame via wireless or hard wired connection. When a connection is detect to the host 910, the interactive TV media frame can access one or more media data stores 920 located on the host 910 to pull one or more media items from the host to the interactive TV media frame for easier viewing and manipulation. Determining which media items to retrieve can be based at least in part upon user input via an interface component, examples of which include a hand-held remote control (e.g., similar to a remote control used for normal television use), wireless pointer device, wireless keyboard, and/or an audio input/receiver (e.g., audio/voice commands).

The interactive TV media frame can have at least two modes: TV mode and passive mode (e.g., interactive media frame display mode). TV mode allows for normal watching of programs and shows on network television. Passive mode allows a user to employ the TV unit to view, display and/or manipulate media items pulled from the host media data store. Thus, the user can take advantage of the larger monitor size of the TV for pleasurable viewing of media items such as pictures, photographs, and video clips when the TV is not in use for program watching. Further, the host is freed up for performing other computer-related functions such as word processing, printing, and the like which cannot be performed on the interactive TV media frame.

Moreover, users can easily switch between TV mode and passive mode by pushing any one of a number of command keys, buttons and/or by voice commands. Similarly, manipulation of the media items is easily and quickly performed by utilizing such command keys, buttons and/or voice commands. In general, the interactive TV media frame display can be employed and implemented in similar aspects as described hereinabove with respect to the interactive media frame.

Figure 10:
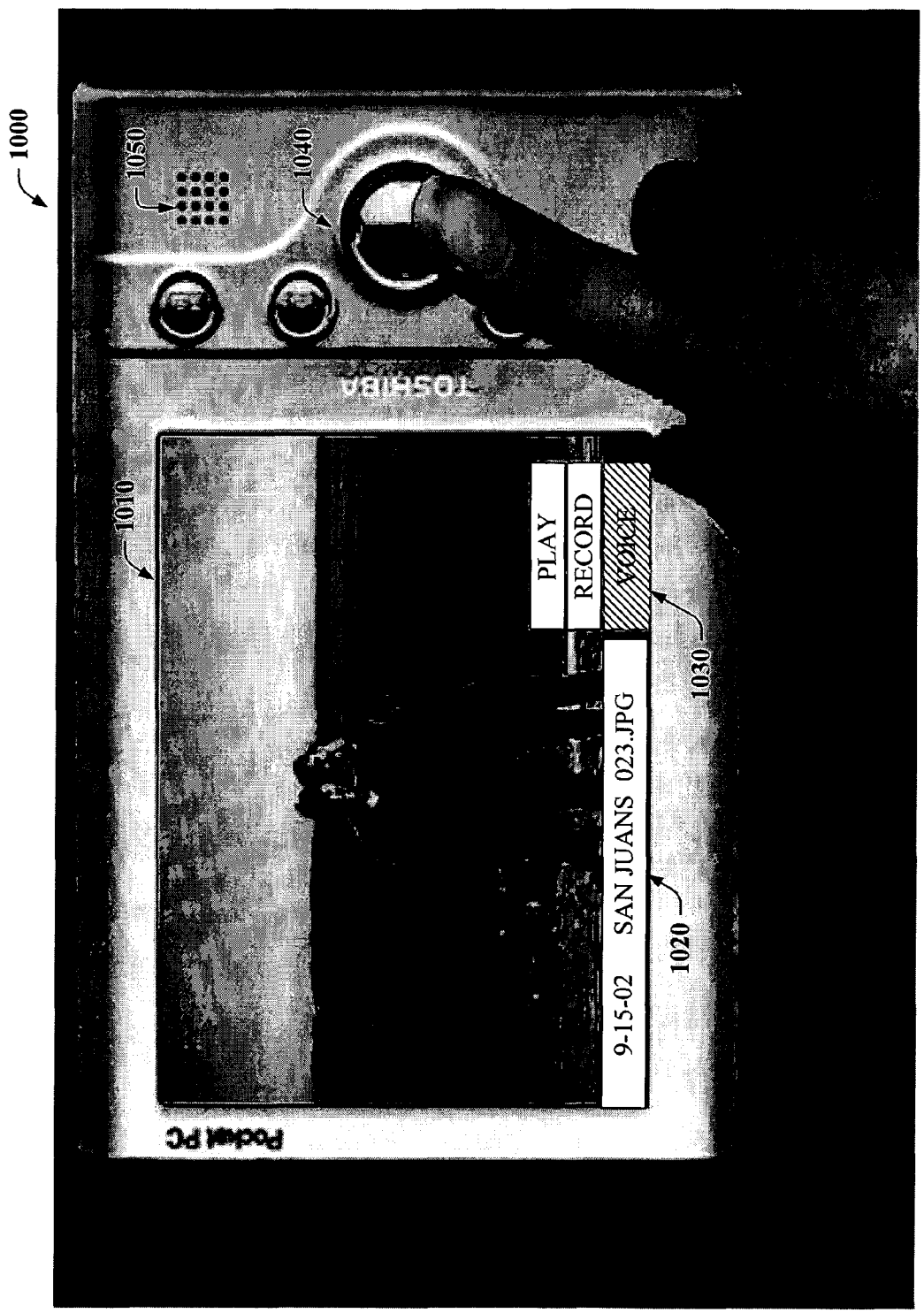
FIG. 10 illustrates an exemplary user interface for an interactive media frame display in accordance with an aspect of the present invention.
Figure 11:
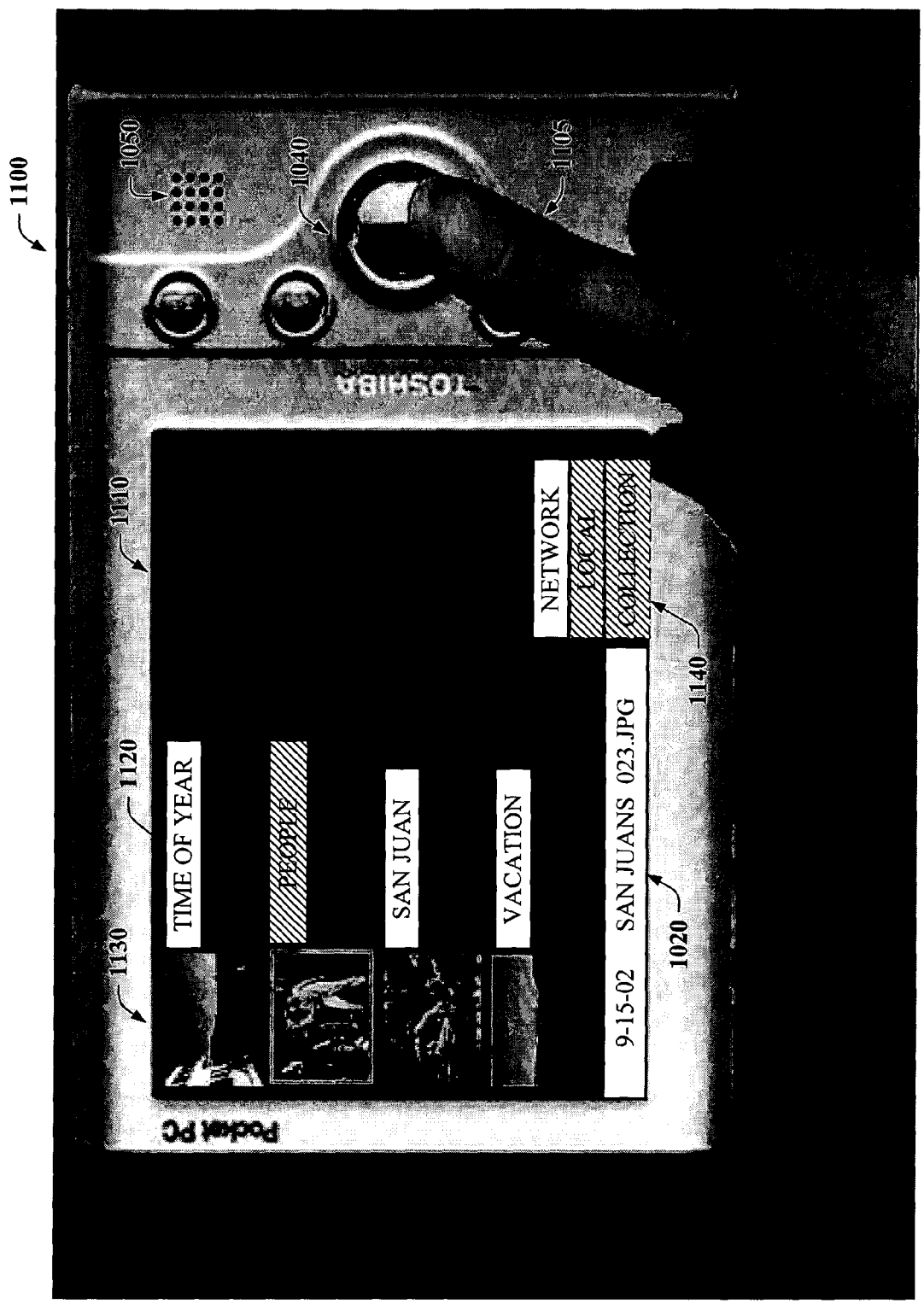
FIG. 11 illustrates an exemplary user interface for an interactive media frame display in accordance with an aspect of the present invention.
Figure 12:
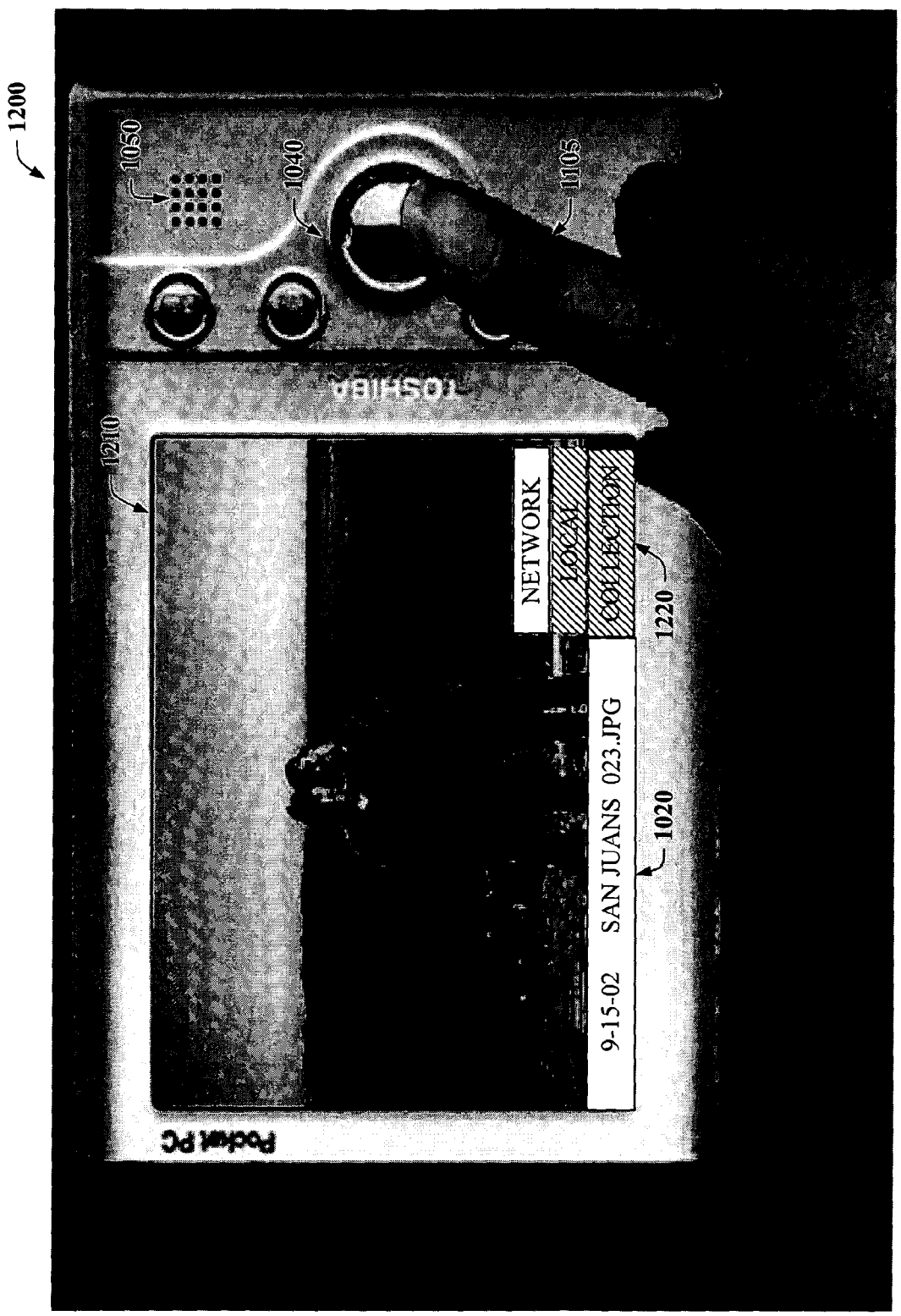
FIG. 12 illustrates an exemplary user interface for an interactive media frame display in accordance with an aspect of the present invention.

Referring now to FIGS. 10-12, there is illustrated exemplary user interfaces of an interactive media frame (IMF) display in accordance with the present invention. In FIG. 10, the IMF display 1000 includes a display area or window 1010 that displays a media item such as a photograph as shown. The display area 1010 can also present the file name and related information (collectively 1020) corresponding to the photograph on display as well as user options 1030 for updating, editing and/or otherwise manipulating the currently viewed media item. Examples of the user options 1030 include play, record, and voice for activating voice input or output (e.g., voice annotation and/or listening to the voice annotation(s)). Selecting the desired user options can be facilitated by a selection component 1040 such as a wheel and/or other pointing device. Other command buttons can also be included to facilitate viewing and/or manipulation of the media item. Voice annotations, recordings, and/or playback of the media item are enhanced by an audio (input and/or output) component(s) 1050, depending on the desired action. Though not shown, an additional speaker or audio reception device can also be present on the IMF display.

FIG. 11 demonstrates an IMF display 1100 in a browse mode, and in particular, browsing a collection of media items stored locally on the IMF display (as opposed from pulling them from the host/network media storage). In the browse mode, a user 1105 can view in a display area/window 1110 any suitable number of categories 1120 relating to the media items stored locally on the IMF 1100. In addition to the categories 1120 listed, at least one media item 1130 demonstrative of the respective categories 1120 are also displayed as a means of reminding the user 1105 of the types of media items in that category 1120. One or more user options 1140 indicate to the user 1105 where the user 1105 is searching and/or browsing for media items. For example, the user 1105 is browsing a local collection of media items and thus, such is indicated by the cross-hatching (e.g., highlighting) of "LOCAL" and "COLLECTION".

FIG. 12 follows from FIG. 11. In FIG. 12, an IMF display 1200 depicts that the user 1105 has selected media item "SAN JUAN 023.JPG" created on or last modified on "9-15-02" (collectively 1020) to view in a display area 1210 of the IMF display 1100. The location of the media item can be reflected in the display area 1210 such as in fields 1220 which indicate that the media item is from the IMF's local collection (stored locally on the IMF display 1200).

Figure 13:
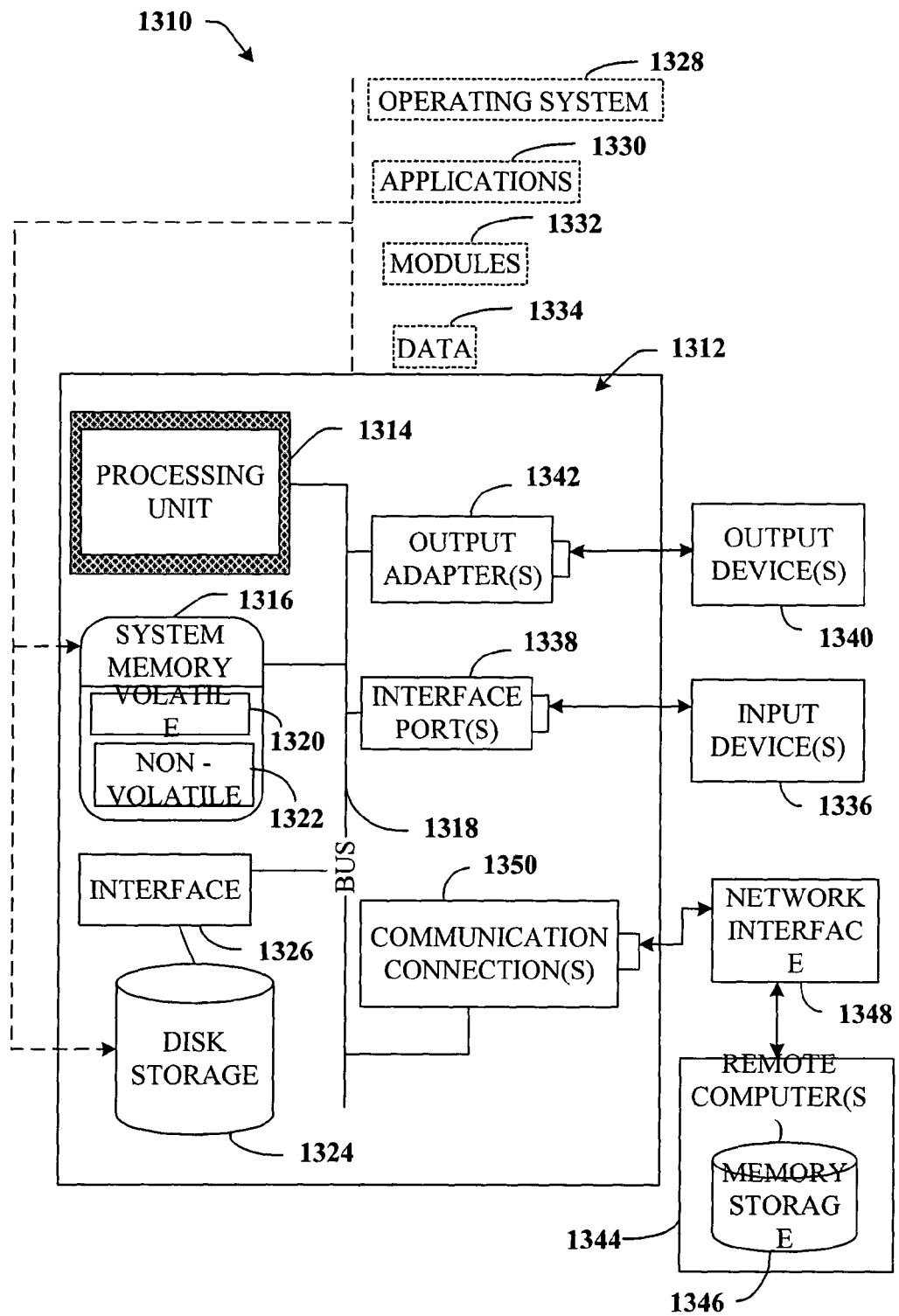
FIG. 13 illustrates an exemplary environment for implementing various aspects of the invention.

In order to provide additional context for various aspects of the present invention, FIG. 13 and the following discussion are intended to provide a brief, general description of a suitable operating environment 1310 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1310 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 13, an exemplary environment 1310 for implementing various aspects of the invention includes a computer 1312. The computer 1312 includes a processing unit 1314, a system memory 1316, and a system bus 1318. The system bus 318 couples system components including, but not limited to, the system memory 316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/nonremovable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 132, and to output information from computer 1312 to an output device 1340. Output adapter 1342 is provided to illustrate that there are some output devices 1340 like monitors, speakers, and printers among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI). Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented interactive media frame display system comprising the following computer executable components:
    a host component comprising at least one host media store;
    a media frame component that facilitates full interactivity by a user to remotely browse and selectively view a plurality of media items in a display cycle, the plurality of media items comprise digital picture or video and are stored in the at least one host media store, the media frame component comprising:
        an annotation component that annotates one or more media items with one or more metadata, the one or more metadata comprising at least one of an intrinsic metadata comprising at least a user behavior and an extrinsic metadata comprising at least a generic training data, the annotation component comprising:
            a metadata generation component comprising an analyzing component that identifies one or more properties associated with the media items;
    a communication connection between the media frame component and the host component, the communication connection enabling the media frame display to:
        retrieve a plurality of media items from the host media store,
        store them in a local store,
        arrange a subset of the media items in a display cycle,
        perform edit operations to a metadata of at least one of the media items, and
        transmit back to the host media store the at least one of modified metadata, and/or the display cycle of the subset of the media items, wherein the local data store is operably connected to the interactive media frame display; and
    a calendar functionality component enabling the one or more media items to be viewed within a viewing cycle coincident with a real time calendar based at least in part on metadata associated with the media items.

2. The system of claim 1, wherein the host component comprising one or more host locations, the host locations comprising at least one of a server and a computer, such that each host location comprises at least one host media store.

3. The system of claim 2, wherein the host locations being arranged in wireless network configuration with the media frame component.

4. The system of claim 2, wherein the host locations being arranged in hard wired network configuration with the media frame component.

5. The system of claim 1, wherein the communication component being at least one of a wireless connection and a hard wire connection.

6. The system of claim 1, wherein the analyzing component comprising a classifier.

7. The system of claim 1, wherein the analyzing component comprising a pattern recognition component.

8. The system of claim 1, wherein the metadata generation component generating new metadata based at least in part upon a cluster of media items retrieved from one or more host locations by analyzing the media items for at least one property common among them.

9. The system of claim 8, wherein analyzing the media items comprises at least one of face recognition, content analysis, and intrinsic metadata comparison.

10. The system of claim 1, further comprising a local data store that stores one or more media items retrieved from one or more host locations.

11. The system of claim 1, further comprising an interface component comprising at least one of a microphone component, one or more command buttons, and a touch screen.

12. The system of claim 11, wherein the one or more command buttons correspond to at least one of play, back, reverse, forward, stop, pause, menu, mode, edit mode, view mode, annotation function, order function, skip, populated metadata lists, file size, media item size, speed, time, date, volume, save, delete, scroll bar, scroll tool, and power.

13. The system of claim 1, further comprising a microprocessor that controls, operates, and tracks retrieval of the one or more media items from one or more host locations.

14. The system of claim 1, wherein the media item comprises at least one of a photograph, a picture, a video, a video clip, a song, a sound, a document, or an electronic mail message.

15. The system of claim 1, further comprising one or more audio output components.

16. The system of claim 12, wherein the one or more audio components are one or more speakers.

17. The system of claim 1, wherein the calendar being located on at least one of the interactive media frame display and the host location.

18. The system of claim 1 is pocket-sized thereby facilitating transportability of viewing favorite media items.

19. The system of claim 1 wherein the interactive media frame display is implemented on a television.

20. The system of claim 19, wherein the television comprises at least two modes: TV mode and passive mode, such that retrieving, viewing, browsing and manipulating media items pulled from the host location are performed in the passive mode.

21. The system of claim 1, the media frame component comprising an artificial intelligence component that facilitates viewing of the media items based at least in part upon one or more of historical data relating to media items received at the media frame component or viewing preferences.

22. The system of claim 21, the media frame component automatically searches for new media items added in the host media store and processes them according to previously set annotation and viewing parameters for existing related items.

23. A computer-implemented method of browsing, viewing, and/or manipulating one or more media items from a remote interactive media frame display comprising:
    retrieving one or more media items from at least one host location;
    displaying the one or more media items on the interactive media frame, wherein the media items comprise digital picture or video;
    receiving a user input that includes a request to browse or view the one or more media items in a display cycle;
    performing one or more acts on the one or more media items based at least in part upon the user input;
    annotating the one or more media items with one or more metadata;
    viewing the one or more favorite media items on the display for enjoyment, wherein the viewing of the one or more media items is in connection with a real time calendar, thereby facilitating a user to view desired media items at a desired time of year, and wherein viewing one or more favorite media items on the display comprises performing at least one of the following:
        designating a percentage of media items having a common metadata from the retrieved media items as a favorite media item for viewing;
        designating the display cycle to cyclically display the favorite media items in connection with at least one of an amount of viewable time per media item or a length of time one or more media items are available for viewing on the display;
    ordering the one or more media items into an alternate display cycle based at least in part upon any one of metadata and user preferences;
    removing/adding the one or more media items from/to the display cycle;
    storing the one or more media items in a local data store operably connected to the interactive media frame display; and
    transmitting back to the host media store the at least one of annotations to the media items and the altered display cycle of the media items.

24. The method of claim 23, further comprising sending the one or more retrieved media items from the host location to the interactive media frame via one of a wireless connection or a hard wired connection.

25. The method of claim 23, further comprising detecting a user interface prior to receiving the user input.

26. The method of claim 25, wherein the user interface comprising at least one of one or more command buttons, an audio receiver component, or a touch screen.

27. The method of claim 26, the one or more command buttons comprising at least one of play, back, reverse, forward, stop, pause, menu, mode, edit mode, view mode, annotation function, order function, skip, populated metadata lists, file size, media item size, speed, time, date, volume, save, delete, scroll bar, scroll tool, and power.

28. The method of claim 26, the audio receiver component being a microphone.

29. The interactive media frame display of claim 28, further comprising means for searching for media items from one or more host locations that have metadata in common with a retrieved media item.

30. The interactive media frame display of claim 28, the means for performing one or more acts to the one or more media items comprising at least one of the following:
    means for annotating the one or more media items with one or more metadata;
    means for viewing one or more favorite media items on the display for enjoyment;
    means for ordering the one or more media items based at least in part upon any one of metadata and user preferences; and
    means for removing the one or more media items from the interactive media frame.

31. The method of claim 23, wherein annotating the one or more media items with one or more metadata comprises:

selecting one or more media items; and tagging the media items with metadata as a group and/or individually.

32. The method of claim 31, further comprising storing the tagged media items in at least one of a local data store and a respective host media store.

33. The method of claim 23, wherein ordering the one or more media items based at least in part upon anyone of metadata and user preferences comprises.

34. The method of claim 23, wherein the one or more media items are viewed in at least one of individually, in clusters, whereby more than one media item is viewable at the same time, and in a slide show.

35. The method of claim 23, wherein the calendar being located at the host location.

36. The method of claim 23, wherein the media items in the interactive media frame comprising items retrieved from one or more host locations.

37. The method of claim 36, wherein the respective media items comprise a host identifier metadata such that changes made to the media items are communicated to their respective host locations.

38. The method of claim 23, further comprising searching for media items from one or more host locations that have metadata in common with a retrieved media item.

39. The method of claim 23 implemented with respect to a television, wherein the remote interactive media frame is an interactive TV media frame.

40. The method of claim 39, wherein the television comprises at least two modes: TV mode and passive mode, such that the method is performed while the television is in the passive mode.

41. A computer-implemented interactive media frame display system comprising the following components:

a media frame component that facilitates full interactivity by a user to remotely browse, manipulate, and view a plurality media items in a display cycle wherein a user designates one or more of a percentage of related media items to display in a single cycle or a time of display for each media item within the display cycle or a period for which each media item is displayed in the display cycle, and wherein the display cycle of the media items is associated with a real-time calendar to facilitate setting the period of display for each media item;

a communication component that connects the media frame component to at least a remote host media store such that it facilitates retrieval of the one or more media items from the remote host media store by the media frame component and transmission of at least one media item modified at the media frame back to the remote host media store;

a local store operably connected to the media frame component for storing the one or more media items retrieved from the remote host media store and the at least one of modified media items or operations performed on the media items.

42. The system of claim 41, wherein the media frame component comprising a scrubbing component that removes tagged metadata from the one or more media.

43. The system of claim 41, further comprising one or more of the remote host media stores for storing a plurality of media items to view, and manipulate via the media frame component.

44. The system of claim 41, the modified media item communicated to the host component includes at least one media item annotated with one of one or more keywords or phrases via a user audio input such that the media item is annotated remotely from the host media store.

* * * * *